United States Patent [19]

Fusek et al.

[11] Patent Number: 4,566,757
[45] Date of Patent: Jan. 28, 1986

[54] HOLOGRAPHIC OPTICAL PROCESSING METHOD AND APPARATUS

[75] Inventors: Richard L. Fusek, Dayton; James S. Harris, Centerville; Kevin G. Harding, Dayton, all of Ohio

[73] Assignee: University of Dayton, Dayton, Ohio

[21] Appl. No.: 548,892

[22] PCT Filed: Feb. 14, 1983

[86] PCT No.: PCT/US83/00184
§ 371 Date: Sep. 23, 1983
§ 102(e) Date: Oct. 12, 1983

[87] PCT Pub. No.: WO83/02831
PCT Pub. Date: Aug. 18, 1983

Related U.S. Application Data

[63] Continuation-in-part of Ser. No. 348,461, Feb. 12, 1982, Pat. No. 4,478,481.

[51] Int. Cl.[4] .............................................. G03H 1/16
[52] U.S. Cl. ............................... 350/162.12; 364/822
[58] Field of Search .................. 350/162.12, 162.13, 350/162.14, 3.83, 3.86; 364/822

[56] References Cited

U.S. PATENT DOCUMENTS 3,514,176  5/1970  Brooks et al. .
4,220,928  9/1980  Bloom et al. .

OTHER PUBLICATIONS

Briones et al., "Holographic Microscopy", *Applied Optics*, vol. 17, No. 6, Mar. 15, 1978, pp. 944–950.
Toth et al., "Reconstruction of a Three-Dimensional Sample using Holographic Techniques", *Applied Physics Letters*, vol. 13, No. 1, pp. 7–9.
Knox, "Holographic Microscopy as a Technique for Recording Microscopic Subjects", *Science*, vol. 153, pp. 989–990, Aug. 26, 1966.

*Primary Examiner*—Bruce Y. Arnold
*Attorney, Agent, or Firm*—Biebel, French & Nauman

[57] ABSTRACT

A method and apparatus for performing optical processing on optical information corresponding to a subject (66) combines known optical processing techniques with holography. A reverse ray-trace holographic system is provided so that the image reconstruction beam (90) passes through the optical system in a direction exactly opposite to that travelled by the subject beam (50) during recording of the hologram (88). Aberrations introduced by the system optics are then completely compensated for, allowing use of lower quality optical components. A single large-aperture lens (68) is used to define a Fourier transform of the optical subject information as the hologram (88) is recorded or the image reconstructed, and the subject information is manipulated within the Fourier transform plane (91).

21 Claims, 11 Drawing Figures

HOLOGRAPHIC OPTICAL PROCESSING METHOD AND APPARATUS

RELATED APPLICATION

This application is a C-I-P of U.S. application Ser. No. 06/348,461 filed Feb. 12, 1982, now U.S. Pat. No. 4,478,481.

Technical Field

The present invention relates generally to analysis of the microstructure present in large transparent or semi-transparent volumes or over large object surface areas and, more particularly, to the performance of such analysis through the use of optical processing techniques.

BACKGROUND ART

As is well known in the art, an optical Fourier transformation can be performed on a subject by illuminating the subject with a coherent light source and using a lens to collect the reflected, and/or diffracted and/or transmitted light containing optical information corresponding to the subject. The lens will define a Fourier transform of the orignal subject information in a plane located one focal length away from the lens at its focus. With this process, subject information is redistributed in the Fourier transform plane to correspond to spatial frequency content. A second lens, located two focal lengths from the first, images the information onto a display screen, recording medium, or the like.

The optical information coming from the subject may be manipulated for the purpose of enhancing detail, removing unwanted subject information, isolating defects, or making precise topographic and optical path measurements. This is accomplished by blocking a portion of the subject information or changing its phase within the transform plane. These techniques are particularly useful where the subject consists of repetitive spatial frequency content such as is present in photomasks or wafers used in the production of microelectronic circuits, since the optical Fourier transform will consist of an array of regularly spaced points of light whose distance from the optical axis is proportional to the spatial frequency.

One example of such a technique is disclosed in U.S. Pat. No 4,000,949 issued Jan. 4, 1977 to Watkins. Using the basic processing scheme outlined above, a photomask is used as the subject. An optical spatial filter is placed within the Fourier transform plane for blocking all subject information other than that corresponding to nonperiodic defects in the mask. Since only defect information will pass through to the display screen, the number of defects and their locations can be determined.

It can be easily seen, however, that aberrations within the optical components of an optical processor, particularly within lenses focusing the subject information and/or the processed information, will be a significant detriment to use of the otpical processor with subjects having microscopic detail. On axis, for example, a focus error aberration can cause loss of spatial frequency information, as illustrated by way of example for a typical optical telescope system in FIG. 1.

Figure 1A:
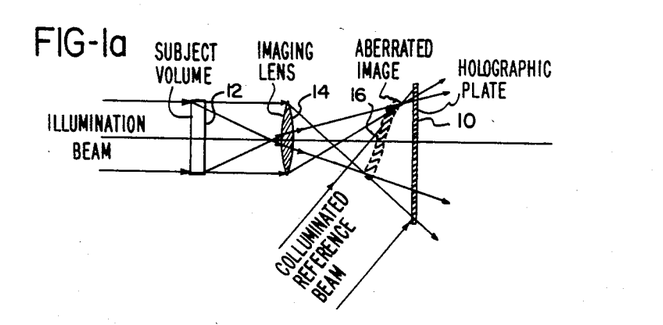
FIG. 1 is a diagram of a hypothetical telescope system, showing the effect of focus error aberration.
Figure 1B:
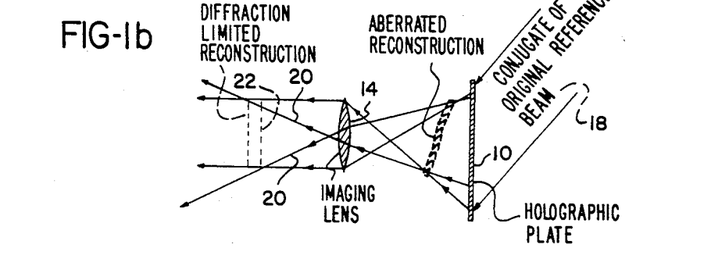

A three-lens system 24 is shown, wherein lenses $1_1$ and $1_2$ are F/1.50, 50 mm diameter, 75 mm focal length lenses, and lens $1_3$ is an F/1.50, 150 mm diameter, 225 mm focal length lens. Assuming the sum of the spherical aberration from lenses $1_2$ and $1_3$ to be 2 mm, the focus of the rays 26 entering the system 24 is moved from a point 28 to a point 30, 77 mm away from lens $1_1$. This results in a smaller, F/1.54 collection angle at lens $1_1$.

Therefore, with a 225 mm focal length for lens $1_3$, which would give an F/4.5 collection angle for lens $1_3$ and the system 24 as a whole if lens $1_1$ collected F/1.50, the lens can only collect:

$$\frac{1.50}{1.54} = \frac{4.50}{Y} \quad Y = \frac{(1.54)(4.50)}{1.50} = F/4.64.$$

Similarly, for 1 mm of special aberration, the focal point is moved to 76 mm away from lens $1_1$ and:

$$Y = \frac{(1.52)(4.50)}{1.50} = F/4.56$$

for the system 24.

To consider these effects directly, the optical transfer function (OTF) of the system may be looked to.

For a diffraction limited system:

$$OTF = H(f_x, f_y) = \frac{\int\int a(f_x,f_y) d\xi d\eta}{\int\int a(o,o) d\xi d\eta}$$

where a $(f_x,f_y)$ is the area of overlap of the pupil collecting spatial frequencies with the restricting pupil function. The OTF with aberrations for two pupils given by:

$$P\left(\xi - \frac{\lambda d f_x}{2}, \eta - \frac{\lambda d f_y}{2}\right) \text{ and } P\left(\xi + \frac{\lambda d f_x}{2}, \eta + \frac{\lambda d f_y}{2}\right) \text{ is } H'(f_x,f_y) =$$

$$\frac{\int\int a(f_x,f_y) \exp\left\{ik\left[W\left(\xi + \frac{\lambda d f_x}{2}, \eta + \frac{\lambda d f_y}{2}\right) - W\left(\xi - \frac{\lambda d f_x}{2}, \eta - \frac{\lambda d f_y}{2}\right)\right]\right\} d\xi d\eta}{\int\int_{a(o,o)} d\xi d\eta}$$

where W is the aberration function.

The Schwarz inequality, $$\left|\int\int X\, Y\, d\xi d\eta\right|^2 \leq \left(\int\int |X|^2 d\xi d\eta\right)\left(\int\int |Y|^2 d\xi d\eta\right)$$

can be used to show directly that $$|H'(f_x, f_y)_{aber.}|^2 \leq |H(f_x,f_y)_{no\ abberrations}|^2$$

This means that aberrations never increase the MTF (the modulus of the OTF), but rather lower the contrast of each spatial frequency component. Thus, the cutoff to the spatial frequency passed by the system will be effectively decreased and the effective F-number thereof will increase. This is especially important if there is a random background to further decrease the contrast.

Figure 2:
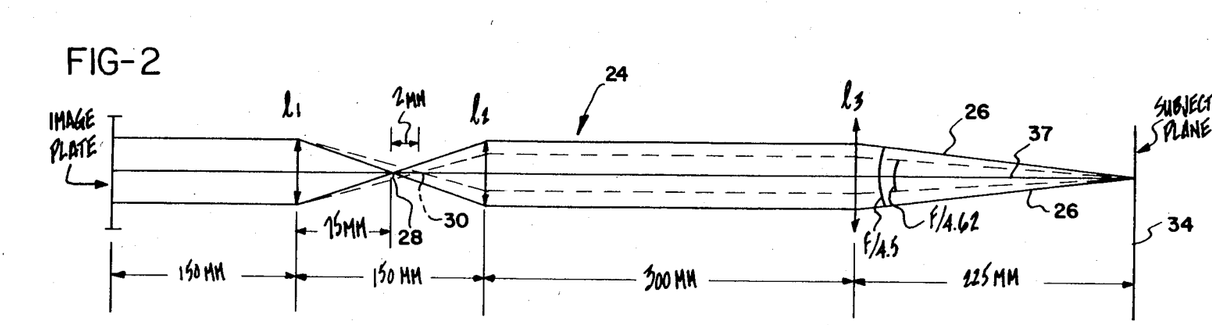
FIG. 2 illustrates the hypothetical telescope system of FIG. 1, showing the effect of vignetting.
Figures 3, 4:
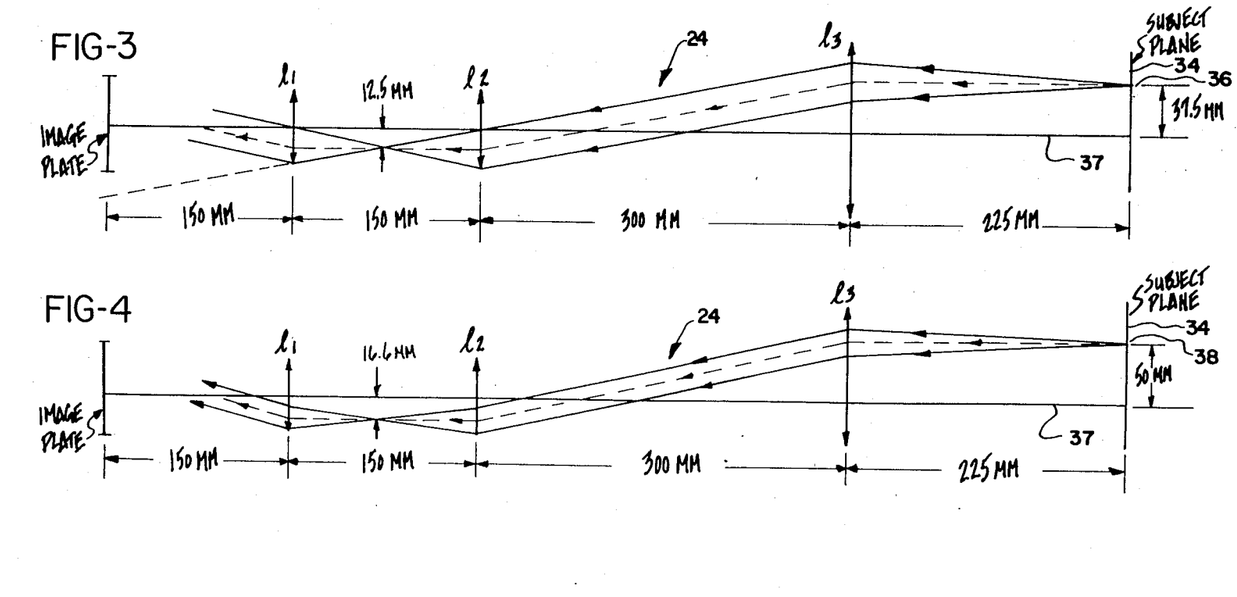
FIG. 3 illustrates the hypothetical telescope system of FIG. 1, again showing the effect of vignetting.

Off-axis, spatial frequency information can be lost even in an ideal aberration-free system directly due to vignetting, as shown in FIGS. 2 and 3. Again, considering the sample three-lens optical system 24, the limit of the system 24 is found by tracing rays from the edge of lens $1_1$. The angle of incidence of these rays at a point on the subject plane 34 gives the cone angle of spatial frequency information which can be collected from that point on the subject.

In FIG. 2, using a thin lens ray trace, it can be seen that only an F/9 cone can be collected by system 24 from a point 36 located 37.5 mm off the axis 37. In FIG. 3, a point 38 located 50 mm off the axis 37 is considered. Again using a thin lens ray trace, it can be seen that only an F/13.5 cone can be collected due to vignetting.

In order to utilize optical processing techniques on objects having microscopic detail with an optical system such as is used in Watkins, it is necessary to employ within the system opitical components of very high quality. Such components will then minimize aberrations within the system. Additionally, to avoid loss of information due to vignetting, system apertures must be made as large as possible. Unfortunately, large aperture optical components of very high quality, particularly lenses, can be obtained only at extremely high cost, making optical processing for such objects far less practical.

Use of high quality lenses creates additional complications other than cost where high-resolution records are desired, since as the resolution of an imaging optic is increased, the depth of focus thereof decreases. Thus, the depth of focus available in the image plane is limited.

Full-field documentation with relatively high resolution can be accomplished through holography. By holographically recording a subject, and then reconstructing the holographic image with the conjugate to the reference beam, a three-dimensional real image of the object is created in space. This real image can then be examined microscopically as if it were the original illuminated object. An added advantage is that a holographic system can document not only reflecting surfaces but also the microstructure inside a thick, transparent object such as optical components. Since the holographic image has no substance, a microscope can focus through the image, even to the opposite side if desired, without the need for a long focus and high quality objective required when a solid object is in the way.

Examples of previous work in holographic microscopy are disclosed in Leith and Upatnieks, "Microscopy by Wavefront Reconstruction," 55 J. Opt. Soc. Amer. 569 (1965); Toth and Collins, "Reconstruction of a Three-Dimensional Microscope Sample Using Holographic Techniques," 13 Appl. Phys. Letters 7 (1968); and Briones, Heflinger and Wuerker, "Holographic Microscopy," 17 Appl. Optics 1944 (1978). The records produced are large aperture wide field of view, large depth of field, three-dimensional images of both transmitting volumes and specularly or diffuse reflecting subjects. Such work, however, has not as yet obtained both the necessary resolution and field of view for viewing and/or analyzing the microstructure of large object surface areas.

One technique available in holography, described in Toth and Collins, is known as reverse ray-tracing. When a hologram 10 is made of a subject 12 through a lens 14 or other optical components, the image information 16 from the subject may be aberrated by the lens 14 (FIG. 4a). If the hologram 10 is repositioned accurately with respect to the lens 14, and the conjugate to the reference beam 18, i.e., the same wavefront as the reference beam but travelling in the opposite direction, is used to reconstruct the holographic image, the image rays 20 will exactly retrace the path of the original subject rays back through the optical system (Fig. 4b). This is not the same as merely turning the lens 14 around, since the information about the lens aberration is stored in the hologram 10. Therefore, the aberrations of the lens 14 will be completely compensated for upon reconstruction and the holographic image 22 will be diffraction limited.

It can be seen that to produce a high resolution holographic image 22, it is not necessary to use a high quality lens 14. Thus, it would appear promising to attempt to incorporate the holographic reverse ray-trace technique into an optical processing system.

What is needed, therefore, is a method and apparatus for optical processing that utilizes holography, and specifically the reverse ray-tracing technique. Such a method and apparatus would enable optical processing to be performed on both detailed three-dimension microscopic and macroscopic subjects with high resolution.

Disclosure of Invention

The present invention provides a method and apparatus for performing optical processing on optical information corresponding to a subject that combines known optical processing techniques with holography. By utilizing a reverse ray-trace holographic system, aberrations introduced by the system optics are completely compensated for, producing diffraction-limited three dimensional images of a subject. A single large aperture lens is used to define a Fourier transform of the optical subject information as the hologram is recorded or the image reconstructed, and the subject information is manipulated within the transform plane.

A source for generating a coherent beam of light, preferably an argon ion laser operating single frequency, provides a beam to a beamsplitter that divides the beam into a subject beam and a reference beam. The subject beam is directed to the subject where it is reflected and/or diffracted thereby. The beam, which now contains optical information regarding the subject, is passed through a lens and focused to define a Fourier transform, imaging the information in the vicinity of a photo-sensitive material, such as a photographic plate. The reference beam is simultaneously directed onto the plate at a predetermined angle of incidence.

After processing, the hologram is replaced and illuminated with the reference beam which is redirected onto the plate in a direction conjugate to the original reference beam. Subject information from the hologram will then exactly reverse ray trace back through the optical system following the same path but in the reversed direction as original subject rays during recording. A three-dimensional real image of the original subject will be formed at the original subject location. Because of the exact reverse ray-trace feature, optical distortions or, aberrations introduced by optical elements in the system will be completely eliminated thus providing a diffraction limited three-dimensional real image.

The subject information is manipulated at the Fourier transform either during recording of the hologram or during image reconstruction. This may be performed, for example, by placing a blocking filter within the transform plane for blocking at least a portion of the subject information. Alternatively, a filter may be placed within the transform plane for altering the phase of at least one of the beams passing therethrough. Other processing techniques are also possible.

This invention offers several important advantages over known optical processing systems and methods.

First, the reverse ray-trace of the image information through the optical system provides an image that is free of aberrations introduced by optical elements.

Second, since such aberrations are eliminated, the optical quality of the imaging optic is not as critical as in known systems. This permits use of components of lesser quality, with very significant reductions in costs.

Third, the use of a single, large-aperture lens provides for a wide field-of-view, with little information loss due to vignetting.

Fourth, the high resolution obtained with this invention provides for microscopic evaluation of recorded images, and enhances results obtained through optical processing and interferrometric techniques.

Accordingly, it is an object of the present invention to provide a method and apparatus for the performance of optical processing to provide such a method and apparatus for utilizing holographic images free from aberrations due to components of the system; to provide full-field, high-resolution holograms capable of microscopic examination; and to provide such a method and apparatus that can perform a variety of optical processing and interferrometric techniques.

Other objects and advantages of the invention will be apparent from the following description, the accompanying drawings, and the appended claims.

BRIEF DESCRIPTION OF DRAWINGS

FIG. 4a is a diagram illustrating generally the recording of a hologram, showing introduction of aberration into the image information;

FIG. 4b is a diagram illustrating generally the reconstruction of a holographic image, wherein reverse ray tracing eliminates aberration from the image information;

MODES FOR CARRYING OUT THE INVENTION

Figure 5:
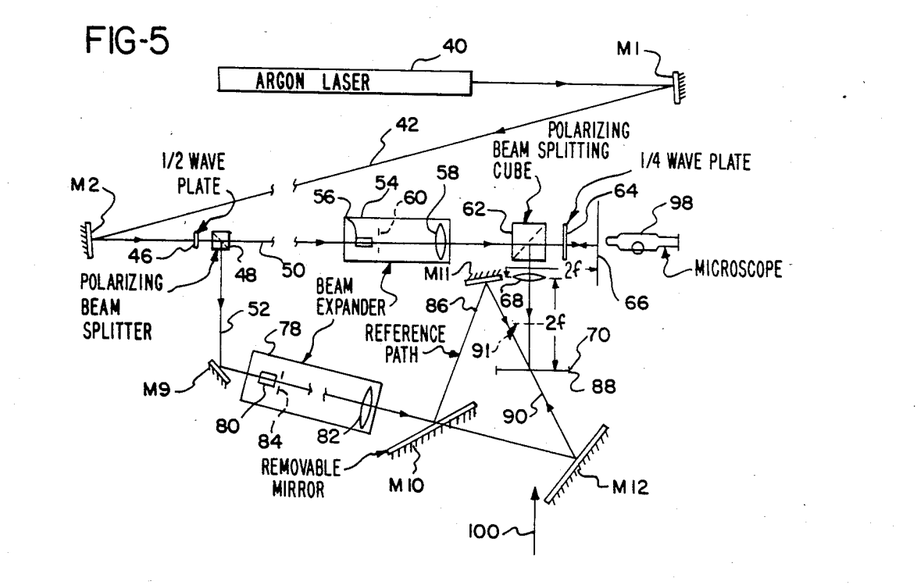
FIG. 5 is a diagram of the apparatus of the present invention.

Referring now to the drawings of the preferred embodiments of the invention, and particularly to FIG. 5, the optical processing apparatus includes a laser 40 that provides a source for generating a coherent beam of light 42.

In the preferred embodiment, an argon ion laser operating single frequency at a wavelength of 0.5145 micrometers is used, in particular, a Spectra Physics Model 166-09 Argon Laser. Any laser source, however, whose output wavelength is compatible with the recording medium will work, including but not restricted to helium-neon, krypton, ruby, neodymium YAG or glass, and metal vapor lasers.

Beam 42 is directed by mirrors M1 and M2 into the system and passes through a half-wave plate 46 which allows the angle of polarization to be continuously adjusted before entering the polarizing beamsplitter 48. It should be noted, however, that although polarizing beamsplitting techniques are used in the preferred embodiment to conserve energy and allow maximum flexibility, any beamsplitting technique that divides the incoming beam into two components will work, such as metal films, grating, dielectric films and holographic elements.

Beamsplitter 48 divides the input beam 42 into a first or subject beam 50 and a second or reference beam 52 having an intensity ratio determined by the angle of polarization of the incoming beam.

The subject beam 50 is then directed to a means 54 for expanding, filtering and collimating beam 50 including lenses 56 and 58 and a mask having a pinhole 60. It then passes through a second polarizing beamsplitter 62 which serves as a selective beam director. This is accomplished in the following manner: light entering this director (beamsplitter 62) passes through because of the polarization orientation established by beamsplitter 48. Beam 50 then passes through a quarter-wave plate 64 where it is converted from linear to circular polarization. It then strikes a subject 66 and is reflected thereby back through the quarter-wave plate 64 where it is converted back to linear polarization but orthogonally oriented. This causes the subject beam 50 to be reflected by the beamsplitter 62 towards a large aperture lens 68 which forms an image in the vicinity of a means for recording the hologram. In the preferred embodiment, lens 68 is a symmetric doublet pair, imaging subject 66 on or near the recording means at one-to-one magnification to maximize the information collected by the lens 68. Other means for directing the subject information to the recording means may be used, including placing the recording means close to the subject and eliminating the imaging system.

While the recording means is shown in the preferred embodiment as a photographic plate 70, it will be recognized that it may be any photo-sensitive material such as photographic films or plates, thermoplastic films, crystalline materials, or any other material capable of recording a hologram.

Figure 6:
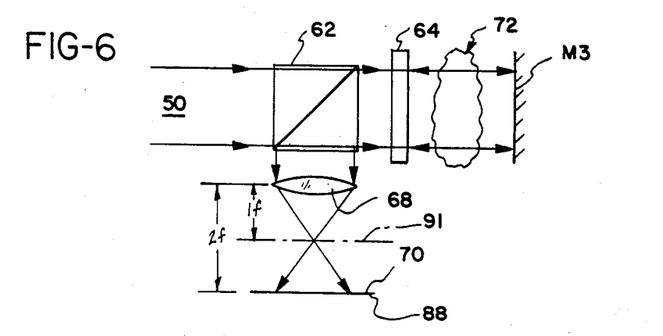
FIG. 6 is a diagram of an alternative embodiment of a portion of the present invention for use when the subject is a transparent or semi-transparent volume.

FIG. 6 shows the preferred arrangement if the subject is a transmitting volume 72. Here a mirror M3 is placed behind the subject 72 which causes the subject beam 50 to be reflected back through the quarter wave plate 64. This double pass scheme offers the advantage that anomalies of interest present in a subject volume 72 are illuminated from both the front and the back thus enhancing visibility. When using the invention to make interferometric measurements of optical path changes or differences, double passing the volume doubles the measurement sensitivity.

Figure 7:
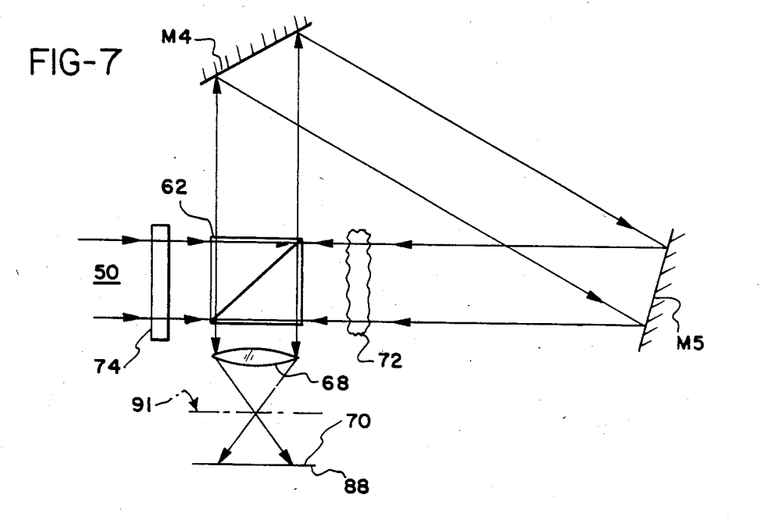
FIG. 7 is a diagram of a further alternative embodiment of a portion of the present invention for use when the subject is a transparent or semi-transparent volume.
Figure 8:
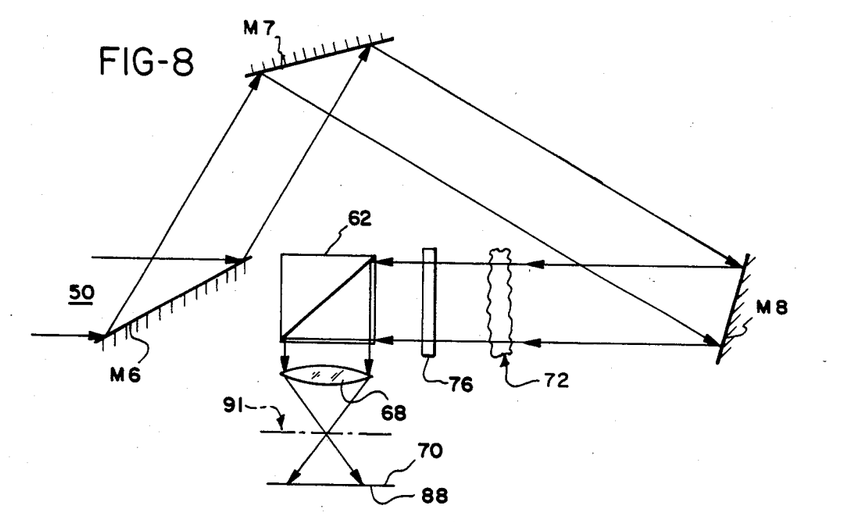
FIG. 8 is a diagram of a still further alternative embodiment of a portion of the present invention for use when the subject is a transparent or semi-transparent volume.

The variation shown in FIG. 7, or the more preferred FIG. 8, is used if the double passing or front illumination of a subject volume 72 is undesirable (e.g., in recording or optical processing of transparencies). Referring to FIG. 7, a half-wave plate 74 is placed in the subject beam 50 ahead of polarizing beamsplitter 62. This allows for adjustment of the subject beam polarization angle and is set to provide vertical, or polarization. Beamsplitter 62 now reflects the subject beam 50 toward mirror M4. This mirror directs the beam to mirror M5, where it is directed through the subject or subject volume 72 and back into beamsplitter 62 and thus into lens 68 as described above.

Similarly, in the preferred variation shown in FIG. 8, the subject beam 50 is directed around the beamsplitter 62 by mirrors M6 and M7 where it is directed through the subject 72 and half-wave plate 76 by mirror M8. It then passes through the system to the photographic plate 70 as previously described.

Referring back to FIG. 5, the reference beam 52 generated from beamsplitter 48 is directed by mirror M9 towards a means 78 for expanding, filtering and collimating beam 52 consisting of lenses 80 and 82, and a mask having a pinhole 84. Beam 52 is expanded and collimated and directed towards mirror M10. In the recording mode, mirrors M10 and M11 direct the reference beam 52 along reference path 86 to the photographic plate 70 where beam 52 combines with the subject beam 50 to expose plate 70, whereupon a hologram 88 is formed in plate 70.

After processing the hologram 88 and returning it to position, mirror M10 is removed and mirror M12 directs the reference beam 52 towards the hologram 88 from the conjugate direction along conjugate path 90. Subject information from hologram 88 will then exactly reverse ray-trace back through lens 68 and beamsplitter 62 following the same path but in the reversed direction as the original subject beam 50 during recording. A three-dimensional image of the subject 66 will be formed at its original location. Because of the exact reverse ray-trace feature, optical distortions or aberrations introduced by optical elements such as lens 68, beamsplitter 62, or the like will be eliminated, providing a diffraction limited three-dimensional real image.

Figures 9, 10:
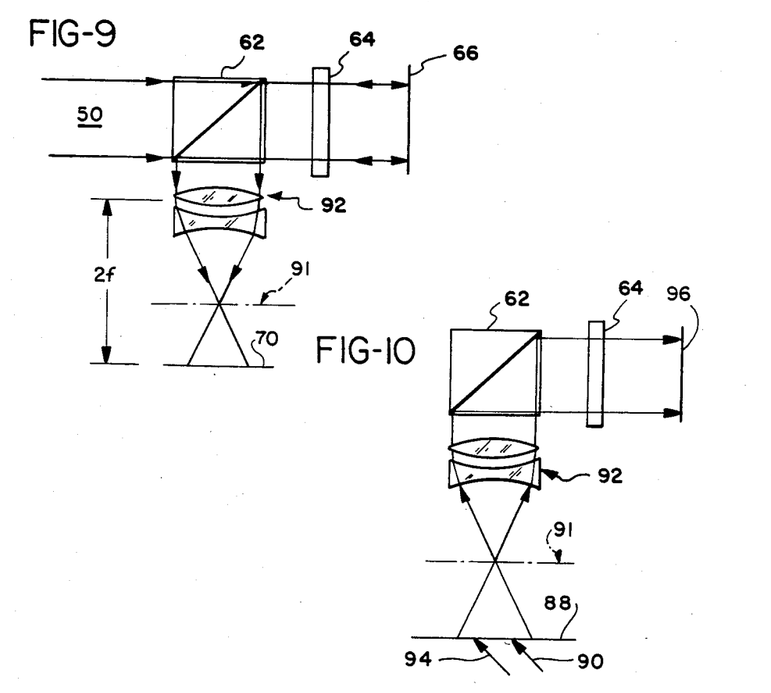
FIG. 9 is a diagram of an alternative embodiment of a portion of the present invention for recording an image plane hologram.
FIG. 10 is a diagram showing image reconstruction with the embodiment of FIG. 9.

In the variation shown in FIG. 9, when the subject 66 or a portion thereof is flat (for example, an integrated circuit mask), the lens used is color corrected (for example, achromat 92), and if care is taken to image the subject 66 on the surface of the plate 70, an image plane hologram is recorded. This image plane hologram can then be illuminated for reconstruction with a broadband source such as white light. This technique offers the advantage that incoherent source illumination will eliminate coherent noise in the reconstructed image. Reconstruction is illustrated in FIG. 10 where the hologram 88 is illuminated with a broadband beam 94 along the conjugate path 90. Reconstruction of the image point will occur at the original subject position 96.

There may be background noise in the holographic image which is not located at the subject plane. If the reference beam's angle of incidence is changed slightly during image reconstruction, this dislocated background noise moves across the field of view while the image is stationary. Therefore, much of this background noise originates from other optical components in the system. Dithering the reference beam 52 while viewing or photographing the holographic image smoothes out the dislocated background and increases the effective contrast. However, this is effective only for a single plane in the reconstructed image, because only a single-image plane of the subject can be exactly imaged in the plane of the hologram. Points in the reconstruction corresponding to points off the hologram are displaced with dithering of the reference beam 52 and will smear out.

In the preferred embodiment, hologram 88 is formed in an Agfa 8E56HD 10.2 cm×12.7 cm (4"×5") plate. The preferred developing processes, as experimentally determined, are either PAAP or HRP/Bromine Methanol. These were found to give substantially better results than standard D-19 processing. The lens 68 described herein collects approximately an F/3.5 cone of light. Thus, the reconstructed real holographic image is diffraction limited for the F/3.5 optical system:

diffraction limited diameter = 2.44 $\lambda$(F-number).

= 2.44 (0.5145 $\mu$m)(3.5) = 4.4 microns.

In experimental testing of the system, however, it appears that resolution of the holographic image better than four microns is attainable.

Because of the high resolution obtained with the presently disclosed system, documentation of the microstructure of a subject is readily facilitated. The reconstructed image may be studied microscopically at the original subject plane through an appropriate means therefor, such as microscope 98 shown in FIG. 5. Moreover, the observed information may be recorded, for example, by a camera (not shown) or other means, used in conjunction with microscope 98.

Because collimated coherent light is used to illuminate the subject in conjunction with a focusing element, an optical Fourier transform of subject information is formed in each of the embodiments of FIGS. 5-9 between the hologram 88 and the lens 68, one focal length from the focusing element, as seen for example at 91 in FIG. 6. This transform plane 91 can be used to manipulate subject information such as spatial frequency content, distribution, and phase, by placing appropriate phase and blocking filters at this location. Such filters may be of any of the presently known optical filters, examples of which are disclosed in U.S. Pat. No. 4,000,949, issued Jan. 4, 1977, to Watkins, and U.S. Pat. No. 4,299,443, issued Nov. 10, 1981, to Minami et al. This serves to optically process subject information and can be performed prior to initial recording of the hologram or after the hologram has been recorded. In either case, the present invention offers several advantages over standard optical processors.

First, the inverse Fourier transform is performed by the same optics that produced the original transform because of the reverse ray-trace feature of this process. Second, the optical quality of the imaging optic need only be sufficient to separate spatial frequencies at the Fourier transform plane relating to the desired image information. This significantly reduces the cost and broadens the applications for optical processing. In general, the Fourier transform is less sensitive to lens aberrations than the image. Third, the use of a single, large aperture lens provides for a wide field-of-view, with little information loss due to vignetting. Finally, the same apparatus may be used to produce effective blocking filters on photosensitive material such as photographic plates, which are accurately matched to the subject's spatial frequency locations in the Fourier transform plane.

The optical processing may be performed through a number of techniques for a variety of reasons. For example, the blocking filters may be placed within the transform plane in order to partially or completely block all or a part of the subject information within the Fourier transform. This will enable the reconstructed image to have certain details enhanced or suppressed, or a portion of the image to be removed entirely. Particular information may be isolated, for instance where the locations of defects within a particular subject are sought. While these advantages are available from optical processing generally, the high resolution achieved with the present invention enables such techniques to be carried out at microscopic levels and at reasonable cost. Additionally, since the filtering may be performed during image reconstruction, the subject itself is required only long enough to record a hologram, allowing optical processing to be performed at a later time.

The optical processing may also be performed through a technique known generally as matched filtering. Rather than completely blocking all or a portion of the subject information as with blocking filters, all or a portion of the information may be diffracted (and/or reflected) out of the optical system at the transform plane. This may serve as a means of effectively blocking information, but can also be used to direct the deflected portion of the information into one or more other systems where the information can be detected, observed, recorded, and/or further manipulated. Matched filtering may have any one of a number of practical applications, such as the separate isolation or detection of specific information pertaining to selected objects or features of a single object. This technique is accomplished using a selective refractive and/or diffractive medium, such as a hologram, as the matched filter.

The subject can also be compared to an unperturbed reference wavefront in the following manner. A hologram 88 is made of the subject, processed, repositioned at its original location, and reilluminated with the reference beam 52 from the conjugate direction 90 via mirror M12. A second reference beam is then combined with the real holographic image at the original subject location via the path of original subject beam 50 and beam director 62. If the intensities are then made equal by adjusting half-wave plate 46, a fringe pattern can be observed. This fringe pattern will map the difference in optical path between the surface figure or optical density of the subject and the wavefront shape of the reference wavefront. Thus, the subject may easily be compared to an ideal flat or spherical surface.

If a plane reference wavefront is combined with the subject image wavefront but is shifted in phase by a quarter-wave relative to the beam used to reconstruct the holographic image, small changes in the subject's surface topography will be highlighted by interference fringes. This is accomplished using the technique outlined above for comparison to an unperturbed reference wavefront, but with a filter placed at the Fourier transform 91 of lens 68 so as to pass only the zero order component therethrough. Either the reference beam 52 or the subject beam 50 is shifted in phase by means of a quarter-wave plate. The phase contrast fringe pattern is then viewed at the subject location.

A permanent record of the phase contrast image of the subject can be recorded by means of a double exposure hologram. A hologram of the subject is first recorded, and the filter is placed at the transform plane 91. Either the reference or subject beam 52 or 50 is shifted in phase by a quarter-wave, and a second hologram is recorded on the same holographic plate. After processing and replacement to its original position, the hologram is then illuminated from the back or conjugate reference beam direction via mirror M12. Both the holographic image of the subject and the reference wavefront will then be reconstructed at the original subject position and can be viewed, for instance, with microscope 98.

Real time holographic interferometric analysis of the subject may be accomplished by first recording a hologram with the apparatus arranged as in any of FIGS. 5–9, depending on the subject type. The developed hologram 88 is then replaced in its original position, with the aid of a kinematic mount, and illuminated with the recording reference beam 52 with mirror M10 in place. Viewing would occur from the position indicated by arrow 100 (Fig. 5).

If either the original subject 66 or 72, or some new subject to be compared, is simultaneously illuminated with light from subject beam 50, and made equal in intensity to the holographic image intensity by adjusting half-wave plate 46, then differences in subject optical paths will be observed as fringes appearing on or near the subject. These optical path differences are referenced to the subject as originally recorded.

A diffraction limited interferogram can be reconstructed in the following manner. A double exposed hologram is recorded by first recording a hologram of the subject in its reference state. Changes to the subject are then made or a different subject is inserted, and a second hologram is recorded on the same holographic plate. After processing and replacement to its original position, it is then illuminated by reference beam 52 from the back or conjugate direction 90 via mirror M12. Both holographic images will then reconstruct at the original subject position and can be viewed therefrom. Optical path differences due to changes in the subject occurring between exposures or differences between the two subjects will be observed as fringes on or near the reconstructed subject's image. Since this interferogram is inherently diffraction limited, due to the reverse ray-trace feature, extremely small fringe spacings can be accurately measured through a magnifying device, such as microscope 98.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of performing optical processing on optical information corresponding to a subject disposed within a subject plane, comprising the steps of:

directing a first coherent beam of light at the subject such that said light is diffracted, reflected and/or transmitted thereby, whereafter said beam contains optical information regarding the subject;

focusing said beam containing said subject information so as to define a Fourier transform plane and to image said information within an image plane beyond said transform plane;

disposing means for recording a hologram thereon at or near said image plane so as to receive thereon said beam containing said subject information;

directing a second coherent beam of light onto said recording means from a first direction so as to form an interference pattern with said first beam containing said subject information;

recording a hologram of said subject information on said recording means;

directing said second beam to said recording means from a direction conjugate to said first direction for diffraction thereby to the subject plane in a direction exactly opposite to that travelled by said first beam containing said subject information, whereby said Fourier transform is redefined at said transform plane and said subject information is carried within said second beam to the subject plane; and manipulating said subject information contained within one of said beams at said transform plane.

2. A method as claimed in claim 1 wherein said manipulating of said subject information is performed by blocking at least a portion of said subject information at said transform plane.

3. A method as claimed in claim 1 wherein said manipulating of said subject information is performed by altering the phase of at least one of said beams passing through said transform plane.

4. A method as claimed in claim 1 wherein said manipulating of said subject information is performed by deflecting at said transform plane at least a portion of said subject information contained within at least one of said beams passing therethrough, said information being deflected from the path travelled by said beam.

5. A method as claimed in claim 1 wherein said first beam is focused by a large aperture lens.

6. A method as claimed in claim 5 wherein the subject is at least partially transparent, and wherein said light from said first beam is diffracted by the subject by passing said beam therethrough.

7. A method as claimed in claim 5 wherein the subject is at least partially opaque, comprising the further steps of:

directing said first beam prior to diffraction, reflection and/or transmission thereof by the subject through a beamsplitter in a first direction, through a quarter-wave plate, and onto the subject whereupon said beam is reflected therefrom; and passing said beam back through said quarter-wave plate and into said beamsplitter in a direction opposite said first direction such that said beam is deflected thereby into said lens.

8. A method as claimed in claim 1, wherein said means for recording a hologram thereon is a photographic plate, said recording of said hologram being performed by exposing and processing said plate.

9. Apparatus for performing optical processing on optical information corresponding to a subject disposed within a subject plane, comprising:

a source for generating a substantially coherent beam of light;

means for dividing said beam into a first beam and a second beam;

means for directing said first beam to the subject such that said beam is diffracted, reflected and/or transmitted thereby, whereafter said beam contains optical information regarding the subject;

means for recording a hologram of the subject thereon;

means for passing therethrough said first beam containing said subject information, focusing said beam to define a Fourier transform within a transform plane, and imaging said beam onto or near said recording means;

means for directing said second beam to said recording means from a first direction at a predetermined angle of incidence thereon so as to form an interference pattern; and means for directing said second beam to said recording means in a direction conjugate to said first direction for diffraction thereby into said lens in a direction exactly opposite to that travelled by said first beam therethrough, so that said subject information is carried within said second beam and a holographic image is reconstructed at said subject plane; means for manipulating said subject information contained within one of said beams at said Fourier transform plane.

10. Apparatus as claimed in claim 9, wherein said manipulating means includes a filter disposable within said transform plane for blocking at least a portion of said subject information therein.

11. Apparatus as claimed in claim 9, wherein said manipulating means includes a filter disposable within said transform plane for altering the phase of at least one of said beams passing therethrough.

12. Apparatus as claimed in claim 9, wherein said manipulating means includes a filter disposable within said transform plane for deflecting at least a portion of said subject information contained within at least one of said beams passing through said transform plane, said information being deflected from the path travelled by said beam.

13. Apparatus as claimed in claim 9 wherein said means for recording a hologram of said subject thereon is a photographic plate.

14. Apparatus as claimed in claim 9, wherein said means for passing therethrough, focusing, and imaging said first beam is a lens.

15. Apparatus as claimed in claim 14 wherein the subject is at least partially opaque, and further comprising a beamsplitter disposed along the path of said first beam and a quarter-wave plate disposed along said first beam path between said beamsplitter and the subject, said beamsplitter being oriented with respect to said first beam path such that said beam passes directly therethrough from said source to the subject, but following reflection by the subject is deflected by said beamsplitter into said lens.

16. Apparatus as claimed in claim 9 further comprising means for examining said image reconstructed at said subject plane.

17. Apparatus as claimed in claim 9 further comprising means for expanding and collimating said first and said second beams.

18. Apparatus as claimed in claim 14 wherein the subject is at least partially transparent, and further comprising means for reflecting light incident thereon, disposed on an opposite side of the subject from the incidence of said first beam thereon, and means for directing light reflected from said reflecting means into said lens, said reflecting and said directing means being disposed such that the portion of light from said first beam passed through the subject is reflected by said reflecting means in the opposite direction from which it is incident upon said reflecting means, is passed through the subject in the opposite direction, and directed into said lens by said directing means.

19. Apparatus as claimed in claim 18 wherein said directing means includes a beamsplitter disposed along the path of said first beam and a quarter-wave plate disposed along said first beam path between said beamsplitter and the subject, said beamsplitter being oriented with respect to said first beam path such that said beam passes directly therethrough from said source to the subject, but following reflection by said reflecting means and passage through the subject in the opposite direction, is deflected by said beamsplitter into said lens.

20. Apparatus as claimed in claim 14 further comprising means for directing said first beam to said lens following diffraction, reflection, and/or transmission of said beam by the subject.

21. Apparatus as claimed in claim 20 wherein said directing means includes a half-wave plate disposed for rotation of the plane polarization of said first beam following diffraction, reflection, and/or transmission thereof by the subject, and a beamsplitter disposed for deflecting said repolarized first beam into said lens.

* * * * *